(12) United States Patent
Bäckman

(10) Patent No.: US 8,931,325 B2
(45) Date of Patent: Jan. 13, 2015

(54) DEVICE AND METHOD FOR MEASURING A CONSTRUCTION

(75) Inventor: Jonas Bäckman, Danderyd (SE)

(73) Assignee: Alignment Systems AB, Kungsor (SE)

( * ) Notice: Subject to any disclaimer, the term of this patent is extended or adjusted under 35 U.S.C. 154(b) by 473 days.

(21) Appl. No.: 13/139,705

(22) PCT Filed: Dec. 15, 2009

(86) PCT No.: PCT/SE2009/051421
§ 371 (c)(1),
(2), (4) Date: Aug. 2, 2011

(87) PCT Pub. No.: WO2010/071571
PCT Pub. Date: Jun. 24, 2010

(65) Prior Publication Data
US 2011/0290019 A1     Dec. 1, 2011

(30) Foreign Application Priority Data

Dec. 15, 2008   (SE) ...................................... 0850137

(51) Int. Cl.
*G01P 21/00* (2006.01)
*G01B 7/00* (2006.01)
*G01B 21/32* (2006.01)
*G01B 21/02* (2006.01)

(52) U.S. Cl.
CPC ................ *G01B 21/32* (2013.01); *G01B 21/02* (2013.01)
USPC ............................................ 73/1.37; 33/556

(58) Field of Classification Search
USPC ............. 73/493, 1.37, 1.38; 33/503, 554, 556
See application file for complete search history.

(56) References Cited

U.S. PATENT DOCUMENTS

| | | | |
|---|---|---|---|
| 5,829,149 A | 11/1998 | Tyson | |
| 6,427,354 B1 | 8/2002 | Vepsalainen | |
| 6,637,278 B1 | 10/2003 | Fasanella | |
| 2008/0010017 A1 | 1/2008 | Belenkiy | |
| 2008/0196260 A1* | 8/2008 | Pettersson | ........................ 33/503 |
| 2010/0286913 A1* | 11/2010 | Colliau | .......................... 701/220 |

FOREIGN PATENT DOCUMENTS

| | | |
|---|---|---|
| CN | 1131982 A | 9/1996 |
| CN | 1224147 A | 7/1999 |
| CN | 101124456 A | 2/2008 |
| CN | 101233384 A | 7/2008 |
| CN | 101246005 A | 8/2008 |
| EP | 1291617 A1 | 3/2003 |
| GB | 2045938 A | 11/1980 |
| WO | WO 00/39576 | 7/2000 |
| WO | WO 2009065945 A1 * | 5/2009 |

OTHER PUBLICATIONS

International Preliminary Report on Patentability for International Application No. PCT/SE2009/051421 mailed Jun. 21, 2011.

* cited by examiner

*Primary Examiner* — John Chapman, Jr.
(74) *Attorney, Agent, or Firm* — Myers Bigel Sibley & Sajovec, P.A.

(57) ABSTRACT

A measuring device 1 for measuring structures is provided, wherein the measuring device including two inertial measuring units 3, 4 arranged at a distance from each other. The measuring device can be provided with means for engaging the constructions that are measured. Also, an arrangement including a measuring device and a base station 21 providing a reference point for the measuring device is provided. Moreover, a kit including the measuring device and adaptors are provided, wherein the adaptors can provide an interface between the measuring device and a measured construction. A method for measuring a stationary construction is also provided, using a measuring device, preferably a measuring kit.

17 Claims, 4 Drawing Sheets

DEVICE AND METHOD FOR MEASURING A CONSTRUCTION

RELATED APPLICATIONS

The present application is a 35 U.S.C. §371 national phase application of PCT International Application No. PCT/SE2009/051421, filed Dec. 15, 2009, which claims priority from Swedish Patent Application No. 0850137-1, filed Dec. 15, 2008, the disclosures of which are hereby incorporated herein by reference in their entireties. The above PCT International Application was published in the English language and has International Publication No. WO 2010/071571 A1.

TECHNICAL FIELD

The invention relates to measuring devices and methods for measuring a construction, such as determining the extension and dimensions of a building or of a vehicle. Especially, it relates to a measuring device including gyroscopes and accelerometers.

BACKGROUND ART

A problem with measuring objects or structures, such as buildings or vehicles, is that the accuracy of the measuring requires skill and often involves tedious handling of the measuring device.

U.S. Pat. No. 5,852,241 describes a measurement system for measuring vehicles, especially the wheel angles and directions of axles on a large vehicle, like a truck. The system comprises measuring units that are arranged on a vehicle and angles and dimensions of different parts of the vehicle are measured. The results of the measurements are fed to a computer that computes the geometric data of the vehicle, and display these data on a monitor. The system uses lasers that need free line of sight and use equipment requiring precise operations performed manually by an operator.

DISCLOSURE OF INVENTION

It is an object of the present invention to provide measuring equipment that is easy to handle and provides reliable measurements.

For this purpose the invention provides a measuring device, for measuring a stationary construction or structure, comprising two inertial measuring units for measuring accelerations in the same directions. Inertial measuring units, so called IMUs, are measuring units comprising motion sensing means, accelerometers and gyroscopes, that have been developed and used to track positions, inclinations and velocities of moving vehicles, for example airplanes and submarines. The sensed accelerations and angular velocities are then integrated with time twice and once, respectively, to provide lengths and angles, respectively. The measuring device of the present invention comprises a body and each inertial measuring unit is fixed to the body. The inertial measuring units are fixed at a distance (L) from each other and each unit comprises means for sensing accelerations and for sensing rotations. Having two inertial measuring units provides redundancy and can be used to detect measuring faults.

A measuring device 1 for measuring structures is thus provided, and the measuring device includes two inertial measuring units arranged at a distance from each other. This measuring device can also be provided with means for engaging the constructions that are measured. Moreover, an arrangement including a measuring device and a base station providing a reference point for the measuring device is provided. Further, a kit including the measuring device and adaptors are provided, wherein the adaptors provide an interface between the measuring device and a measured construction. The invention also provides a method for measuring a stationary construction, the method uses a measuring device, preferably a measuring kit.

In one embodiment the two inertial measuring units have different ranges, and the first one of the units can have a greater resolution than the other, and provide more exact measuring data. The other, having a greater range, can still provide measuring data when the measuring device is subjected to large accelerations putting the first one out of range.

Preferably, one of the inertial measuring units comprises three accelerometers arranged in first, second and third coordinate directions and the other inertial measuring unit also comprises three accelerometers in the same first, second and third coordinate directions.

In one embodiment the measuring device comprises at least one roller, wherein the, or each, roller is adapted to rotate freely in relation to the measuring unit and provide an interface between the unit and a surface that is measured. In one preferred embodiment the housing is elongated having two ends and the roller is arranged at one of the ends.

The invention also provide a measuring kit comprising a measuring device as described above and an adaptor for interfacing the structure to be measured, wherein the adapter and device is adapted to be attached to each other in a releasable way so that they also are detachable from each other. The adaptor can have a wheel or roller as interfacing means. Other adaptors in accordance with the invention are sleeves for surrounding protruding parts of a structure providing a fix measuring point when engaging the protruding part, like a bolt head. Other adaptors are designed for mating holes in the measured object, e.g. conical adaptors of different sizes. Still others are provided for reaching a measuring point and provide an extension for the measuring device, for example, an elongated rod attached to one end of the measuring device.

The invention also provides a base unit for the measuring device, wherein the base unit is adapted to receive the measuring device in a predefined position, and preferably also direction, to provide a reference position, and preferably also a reference direction, for the measuring device. Thus, an origin of coordinates is provided for the measurements.

MODE(S) FOR CARRYING OUT THE INVENTION

Figure 1:
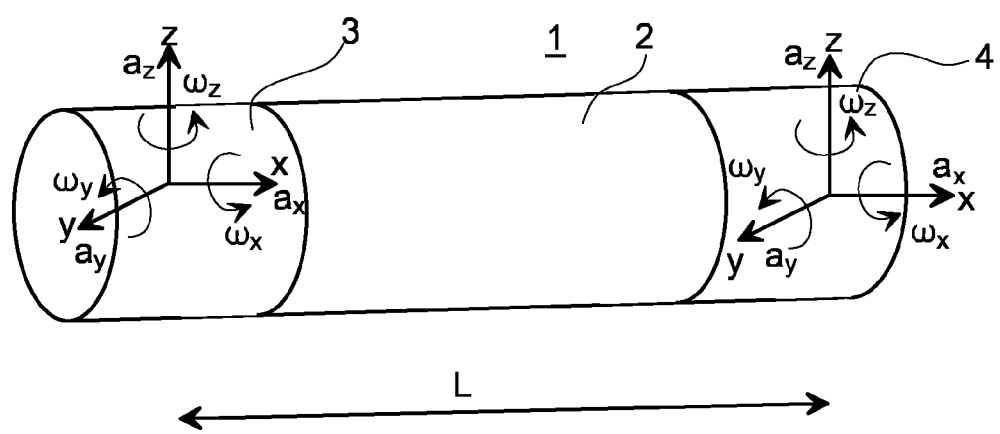
FIG. 1 illustrates a measuring device in accordance with the invention.

FIG. 1 illustrates a measuring device 1 comprising a housing 2 and at least two inertial measuring units 3, 4 arranged in the housing 2. The housing is elongated like a rod and the size is suitably for easy handling, a size like a hand held mobile phone or a pen. Each inertial measuring unit (IMU) comprises at least two, and preferably three, accelerometers, sensing accelerations $a_x$, $a_y$, $a_z$ in perpendicular directions, preferably three perpendicular directions x, y, z. Each IMU 3,4 also comprises at least two, and preferably three, gyroscopes, sensing rotations, i.e. angular velocities $\omega_x$, $\omega_y$, $\omega_z$, around perpendicular directions, preferably three perpendicular directions x, y, z. The IMUs 3, 4 are arranged at a fixed distance L from each other; one at each end of the measuring device 1. Both IMUs 3, 4 measure in the same directions, so that they independently can provide two independent measurements of the motion of the measuring device 1. The measuring device can preferably be adapted to alarm when the measurements deviate too much, i.e. more than the nominal measuring accuracy of the units, which indicates a faulty measurement.

Figure 6:
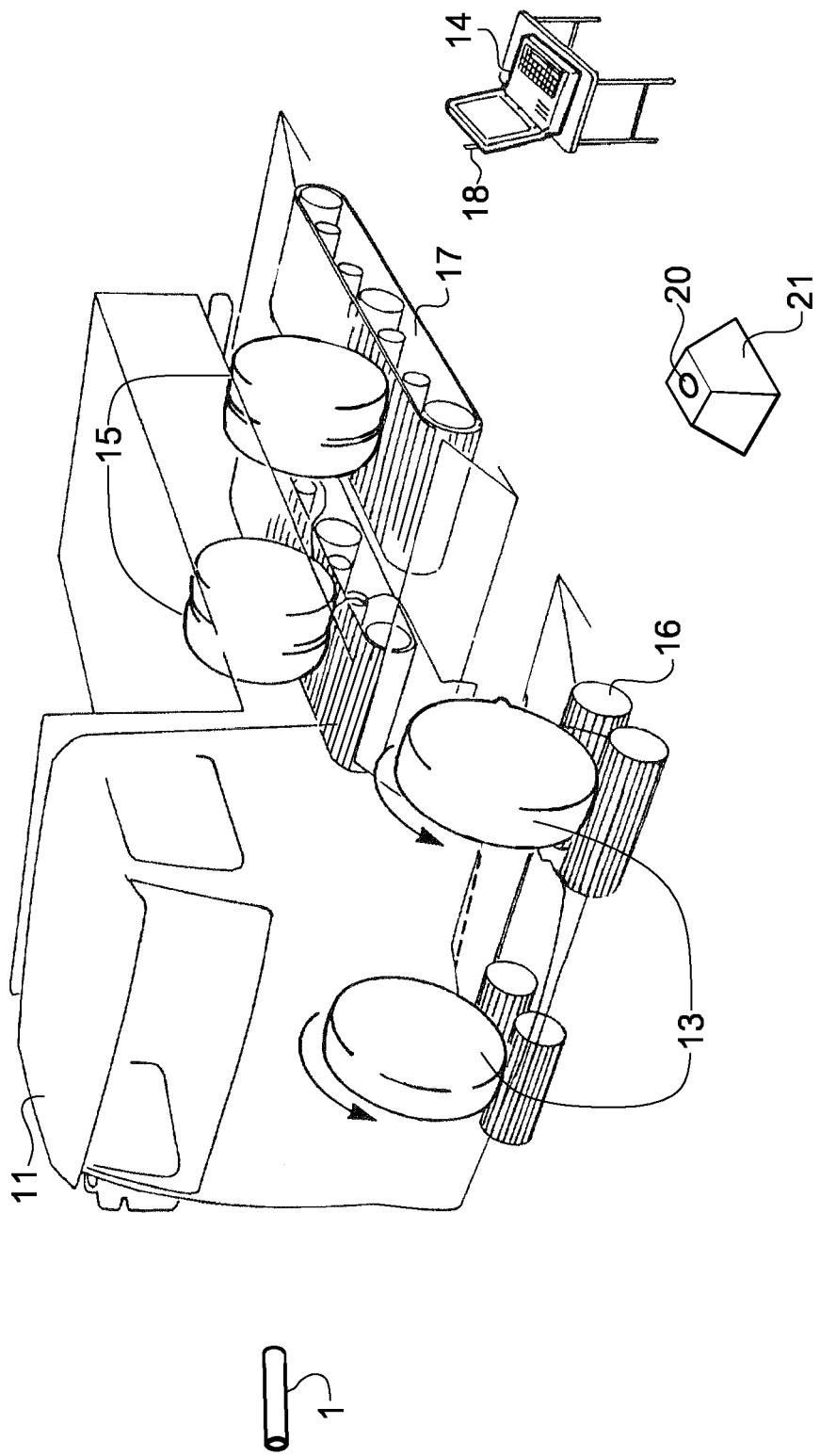
FIG. 6 illustrates a measuring arrangement using a measuring device in accordance with the invention.

The measuring device also includes powering means, such as a battery (not shown), and preferably also communication means (not shown), such as wireless communication means, e.g. a radio transceiver, for communicating with an external computer unit. An example of an external computer unit is illustrated in FIG. 6, showing a laptop (see FIG. 6) provided with a display, which is suitably adapted for providing a user interface for an operator during a measuring session. The IMU can suitably be provided with computing means to calculate distances, like the length, height and width of objects, and angles from the sensed accelerations and angular velocities. Alternatively, an external computing unit (e.g. the laptop in FIG. 6) to which measuring data is transferred from the IMU's performs, such calculations.

Moving the measuring device 1 in the x-axle direction provides two measurements of the acceleration in this direction. The IMUs 3, 4 are preferably of different types, e.g. one is more sensitive than the other. For example, the first IMU 3 can be provided with accelerometers with a measuring range from 0-1 g (g=constant of gravity, 9.8 m/s$^2$), while the second IMU 4 has accelerometers having a measuring range from 0-5 g, is less sensitive, but is also less accurate than the first IMU 3. In such an arrangement, two complete measurements will normally be provided for the movement of the measuring device 1, but if the measuring device is subjected to accelerations between 1 and 5 g, the first IMU 3 will be "out of range" and only one measurement will be provided. The device 1 is preferably adapted to alarm when one of the IMUs, in his case the first IMU 3, is out of range, i.e. do not provide a reliable signal or measurement.

The measuring device preferably also includes wireless communication means and is adapted for communication with an external device, such as a computer 14, illustrated in FIG. 6. The figure illustrates a measuring arrangement using a measuring device in accordance with the invention during measuring of a stationary structure, illustrated by a truck. The truck has a body 11 and front and rear wheels 13, 15, and is positioned on rollers 16, 17 so that the wheels can be rotated during the measuring. The arrangement also includes a base station 21 and the laptop computer 14. The laptop computer 14 is provided with radio communication means 18 for communicating with the measuring device 1. The base station 21 is provided with a recess 20 for receiving the measuring device. Preferably, the recess is formed to receive the measuring device in a certain position as well as direction.

The arrangement can be specifically adapted to measure a vehicle like a car, for example, by storing a database in the computer 14 with geometric data for a large number of different car models. The computer can suitably be adapted to provide an image of the measured vehicle on the display with the measuring points marked up.

Another example is to measure a building. The computer can be adapted to provide a 3-dimensional model of the building, both the inside and the outside.

FIGS. 2 to 5 illustrate embodiments of the measuring device in FIG. 1. The illustrated embodiments can be provided for by adaptors. As an example, a measuring kit comprising one measuring device 1 and four different connectable adapters 5-8, each for a specific purpose, can be provided.

Figure 2:
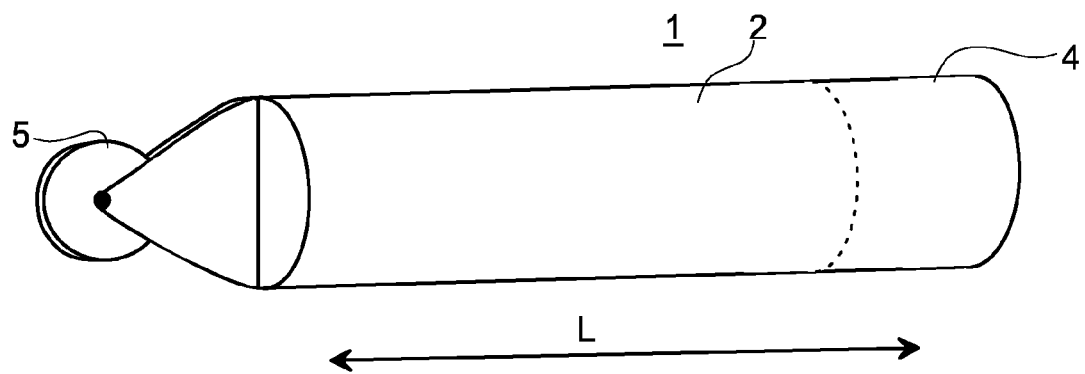
FIG. 2 illustrates a measuring device provided with a surface engaging wheel.

FIG. 2 illustrates an embodiment of a measuring device 1 provided with a wheel or roller 5. This embodiment is useful for measuring surfaces, for example the curvature of a chassis part. During use, the wheel of the device 1 is placed on a surface, e.g. a deformed body part of a car, and it is subsequently rolled along the surface with the wheel held against the surface and following the surface. In this way a contour line of the surface is provided. Thus, the measuring device 1 with a wheel 5 is adapted to provide coordinates continuously, i.e. at a high rate. The wheel 5 can be an integrated part of the measuring device. Alternatively, the wheel 5 is a part of an adaptor having means for fastening to the measuring device 1. This wheel adaptor can comprise a sleeve or tubular cover for enclosing an end section of the measuring device and connect the adaptor to the device.

Figure 3:
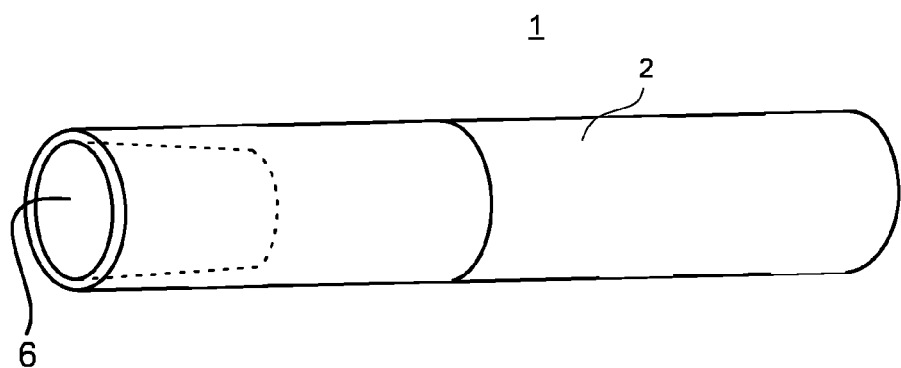
FIG. 3 illustrates a measuring device provided with a sleeve for engaging a protrusion of an object that is measured.
Figure 4:
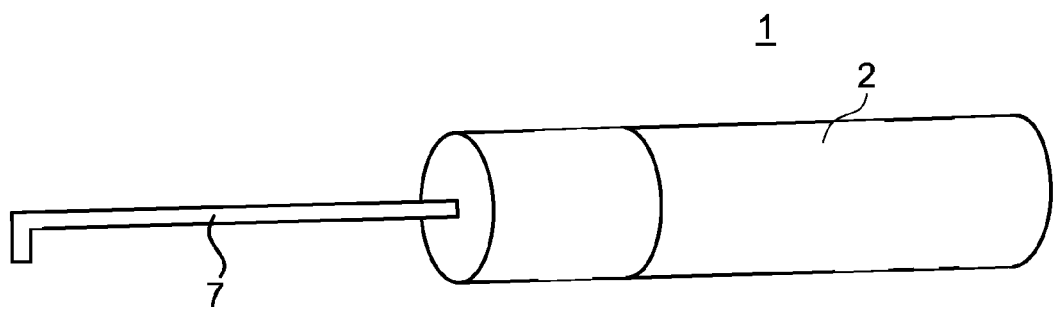
FIG. 4 illustrates an elongated rod for reaching measuring points on a structure, for example into narrow passages or locations that are hard to reach, e.g. a ceiling inside a room.
Figure 5:
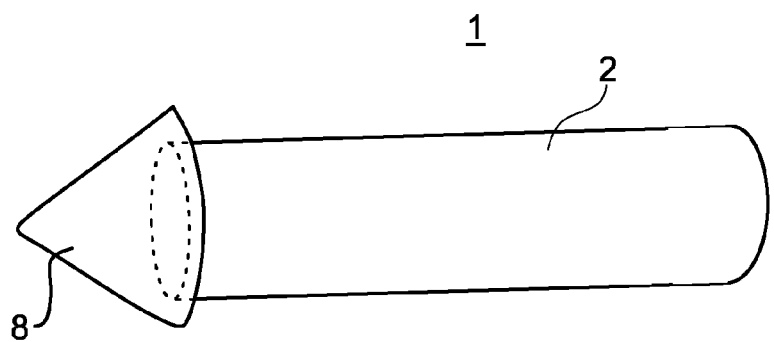
FIG. 5 illustrates a measuring device provided with a cone for centering the measuring device.

FIGS. 3 to 5 illustrate embodiments for determining coordinates for different types of measuring points, wherein a measuring device is provided with adaptors for the measuring points. Preferably, each adaptor is releasably connectable to the measuring device. The measuring device and the adaptors can be provided as a measuring kit.

FIG. 3 illustrates an embodiment of the measuring device 1 provided with a sleeve 6 for centering the measuring device on protruding parts, like a handle or an axle end. The sleeve 6 has an opening and a narrowing channel for enclosing the protruding part. Preferably, a set of sleeves 6 of different sizes can be provided for adapting the measuring device to centre on protrusions of different sizes.

FIG. 4 illustrates an embodiment of the measuring device 1 provided with a extension rod 7 for reaching measuring positions in places that are different to reach like into small and narrow compartments.

FIG. 5 illustrates an embodiment of the measuring device 1 is provided with a cone 8 for centering the measuring device in circular holes.

The invention claimed is:

1. A measuring device for measuring a structure comprising a body comprising first and second inertial measuring units, each inertial measuring unit being fixed to the body and fixed at a distance in relation to the other inertial measuring unit, each inertial measuring unit comprising at least two accelerometers for sensing accelerations and at least two gyroscopes for sensing rotations, wherein the first and second inertial measuring units are arranged to measure in the same directions, and wherein the measuring device is adapted to alarm to indicate a faulty measurement when measurements by the first and second inertial measuring units deviate more than a nominal measuring accuracy.

2. A measuring device according to claim 1, wherein the first inertial measuring unit includes three accelerometers and is adapted to sense accelerations in three perpendicular coordinate directions, and the second inertial measuring unit includes three accelerometers and is adapted to sense accelerations in three perpendicular coordinate directions.

3. A measuring device according to claim 1, comprising a roller arranged to rotate freely in relation to the measuring device and provide an interface between the device and a surface that is measured.

4. A measuring device according to claim 3, wherein the body is an elongated body having two ends and the roller is arranged at one of the ends.

5. A measuring kit comprising the measuring device according to claim 1 and an adaptor for interfacing the structure to be measured, wherein the adaptor is releasably connectable to the device.

6. A measuring kit according to claim 5, wherein the adaptor comprises an opening for centering on a protrusion.

7. A measuring kit according to claim 5, wherein the adaptor is conical for centering in a hole.

8. A measuring kit according to claim 5, wherein the adaptor is elongated for reaching a measuring point.

9. A method for measuring a stationary construction including the step of moving the measuring device according to claim 1 in relation to the construction.

10. A method according to claim 9, wherein the measuring device is part of a kit including an adaptor for interfacing the stationary construction to be measured, and the method includes connecting the adaptor to the measuring device, and the step of moving includes moving the measuring device together with the connected adaptor.

11. A method according to claim 10, wherein the adaptor comprises an opening for centering on a protrusion.

12. A method according to claim 10, wherein the adaptor is conical for centering in a hole.

13. A method according to claim 10, wherein the adaptor is elongated for reaching a measuring point.

14. A measuring device for measuring a structure comprising a body comprising first and second inertial measuring units, each inertial measuring unit being fixed to the body and fixed at a distance in relation to the other inertial measuring unit, each inertial measuring unit comprising at least two accelerometers for sensing accelerations and at least two gyroscopes for sensing rotations, wherein the first and second inertial measuring units are arranged to measure in the same directions, and wherein the two inertial measuring units have different measurement ranges.

15. A measuring system comprising:
a measuring device for measuring a structure comprising a body comprising first and second inertial measuring units, each inertial measuring unit being fixed to the body and fixed at a distance in relation to the other inertial measuring unit, each inertial measuring unit comprising at least two accelerometers for sensing accelerations and at least two gyroscopes for sensing rotations, wherein the first and second inertial measuring units are arranged to measure in the same directions; and
a base unit for the measuring device, wherein the base unit is adapted to receive the measuring device in a predefined position to provide a reference position for the measuring device.

16. A measuring system according to claim 15, wherein the base unit is adapted to receive the measuring device in a predefined direction to provide a reference direction for the measuring device.

17. A measuring system according to claim 15, comprising a display unit communicatively connected to the measuring device.

* * * * *